United States Patent
Kobayashi et al.

(10) Patent No.: US 6,180,022 B1
(45) Date of Patent: Jan. 30, 2001

(54) MN-ZN FERRITE

(75) Inventors: Osamu Kobayashi; Koji Honda; Shunji Kawasaki, all of Asaba-cho (JP)

(73) Assignee: Minebea Co., Ltd., Nagano-ken (JP)

(*) Notice: Under 35 U.S.C. 154(b), the term of this patent shall be extended for 0 days.

(21) Appl. No.: 09/374,759

(22) Filed: Aug. 16, 1999

(30) Foreign Application Priority Data

Aug. 19, 1998 (JP) .................................. 10-249189
Feb. 8, 1999 (JP) .................................. 11-29994

(51) Int. Cl.[7] .................................. C04B 35/38
(52) U.S. Cl. .................................. 252/62.62; 252/62.53; 252/62.58; 252/62.59; 252/62.6; 252/62.63
(58) Field of Search .................. 252/62.62, 62.58, 252/62.57, 62.59, 62.6, 62.63

(56) References Cited

U.S. PATENT DOCUMENTS 3,188,290 * 6/1965 Dam et al. ................... 252/62.6
3,567,641 * 3/1971 Ross et al. ................... 252/62.59

FOREIGN PATENT DOCUMENTS 11 77 538   9/1964 (DE) .
740 755    11/1955 (GB) .

* cited by examiner

Primary Examiner—C. Melissa Koslow
(74) Attorney, Agent, or Firm—Oliff & Berridge, PLC

(57) ABSTRACT

A Mn—Zn ferrite having large electrical resistance, which can withstand the use in high frequency region exceeding 1 MHz, is provided. The Mn—Zn ferrite comprises the following basic components: 44.0 to 50.0 mol % $Fe_2O_3$, 4.0 to 26.5 mol % ZnO, 0.1 to 8.0 mol % at least one member selected from the group consisting of $TiO_2$ and $SnO_2$, 0.1 to 16.0 mol % CuO, and the remainder being MnO. By the addition of $TiO_2$, $SnO_2$ and CuO, even if the material is sintered in the air, electrical resistance of $10_3$ times or more as high as that of the conventional Mn—Zn ferrite can be obtained, and a high initial permeability of 300–400 as estimated can be secured even at high frequency of 5 MHz.

8 Claims, 2 Drawing Sheets

MN-ZN FERRITE

BACKGROUND OF THE INVENTION

1. Field of the Invention

The present invention relates to a soft magnetic material, particularly a Mn—Zn ferrite suitable for low loss material for a transformer for switching power supply, a rotary transformer and deflection yoke, electronic parts such as for various kind of inductance elements and impedance elements for countermeasure against EMI, or for electromagnetic wave absorbers.

2. Description of the Related Art

The representative oxide magnetic material having a soft magnetism includes Mn—Zn ferrite. Conventionally, this Mn—Zn ferrite generally has a basic component composition containing more than 50 mol %, 52 to 55 mol % on the average, of $Fe_2O_3$, 10 to 24 mol % of ZnO and the remainder being MnO. In general, the Mn—Zn ferrite is produced by mixing each of raw material powders of $Fe_2O_3$, ZnO and MnO in predetermined proportions, forming a predetermined shape through the steps of calcination, milling, component adjustment, granulation and pressing, and then conducting a sintering treatment by maintaining the green compact at 1,200 to 1,400° C. for 3 to 4 hours in reducing atmosphere which suppresses an oxygen concentration by flowing nitrogen. The reasons for sintering in reducing atmosphere are as follows. If the green compact is sintered in air when $Fe_2O_3$ contains more than 50 mol %, densification does not proceed sufficiently, so that preferable soft magnetism is not obtained. Further, $Fe^{2+}$ formed by reduction of $Fe^{3+}$ has a positive crystal magnetic anisotropy, and has an effect to erase a negative crystal magnetic anisotropy of $Fe^{3+}$, thereby improving a soft magnetism. However, if sintering is conducted in an air, such a reductive reaction cannot be expected.

Where a Mn—Zn ferrite is used as a magnetic core material, eddy current flows as a frequency region used increases, and loss by the eddy current increases accordingly. Therefore, in order to increase the upper limit of the frequency which can be used for a magnetic core material, it is necessary to make its electrical resistance large as much as possible. However, the electrical resistance in the above-described general Mn—Zn ferrite is a value smaller than 1 Ωm due to enjoyment of electrons between the above-described $Fe^{2+}$ and $Fe^{2+}$ (interionic), and the frequency which can be used is limited up to approximately several hundreds of kHz. Initial permeability is considerably decreased in the frequency region exceeding 1 MHz, and properties as the soft magnetic material are completely lost.

In some instances, however, such a countermeasure is taken that in order to increase the electrical resistance of Mn—Zn ferrite, CaO, $SiO_2$ and the like are added as additives to the above-described main components to make the resistance of grain boundary high, and also sintering is conducted at a low temperature of approximately 1,200° C. to reduce the grain size up to approximately 5 μm, thereby increasing the proportion of the grain boundary. However, it is difficult to obtain electrical resistance exceeding 1 Ωm even with such a countermeasure, and a fundamental solution is not yet attained.

SUMMARY OF THE INVENTION

The present invention has been completed in view of the above-described conventional problems.

Accordingly, an object of the present invention is to provide a Mn—Zn ferrite having a high electrical resistance which can sufficiently withstand the use in a high frequency region exceeding 1 MHz.

According to a first aspect of the present invention, there is provided a Mn—Zn ferrite comprising the following basic components:

44.0 to 50.0 mol % $Fe_2O_3$;
4.0 to 26.5 mol % ZnO;
0.1 to 8.0 mol % at least one member selected from the group consisting of $TiO_2$ and $SnO_2$;
0.1 to 16.0 mol % CuO; and
the remainder being MnO.

According to a second aspect of the present invention, there is provided the Mn—Zn ferrite which further comprises at least one member selected from the group consisting of 0.005 to 0.200 mass % CaO and 0.005 to 0.050 mass % $SiO_2$ as additives according to the above-described basic components.

The Mn—Zn ferrite according to the above first and second aspects can further contain the following additives, if desired and necessary.

In one preferred aspect, the Mn—Zn ferrite further contains at least one member selected from the group consisting of 0.010 to 0.200 mass % $V_2O_5$,
0.005 to 0.100 mass % $Bi_2O_3$,
0.005 to 0.100 mass % $In_2O_3$,
0.005 to 0.100 mass % PbO,
0.001 to 0.050 mass % $MoO_3$, and
0.001 to 0.050 mass % $WO_3$ as additives.

In another preferred aspect, the Mn—Zn ferrite further contains at least one member selected from the group consisting of 0.010 to 0.200 mass % $ZrO_2$,
0.010 to 0.200 mass % $Ta_2O_5$,
0.010 to 0.200 mass % $HfO_2$,
0.010 to 0.200 mass % $Nb_2O_5$, and
0.010 to 0.200 mass % $Y_2O_3$ as additives.

In further preferred aspect, the Mn—Zn ferrite further contains at least one member selected from the group consisting of 0.020 to 0.300 mass % $Cr_2O_3$ and 0.020 to 0.300 mass % $Al_2O_3$, as additives.

DETAILED DESCRIPTION OF THE INVENTION

Embodiment

Figure 1:
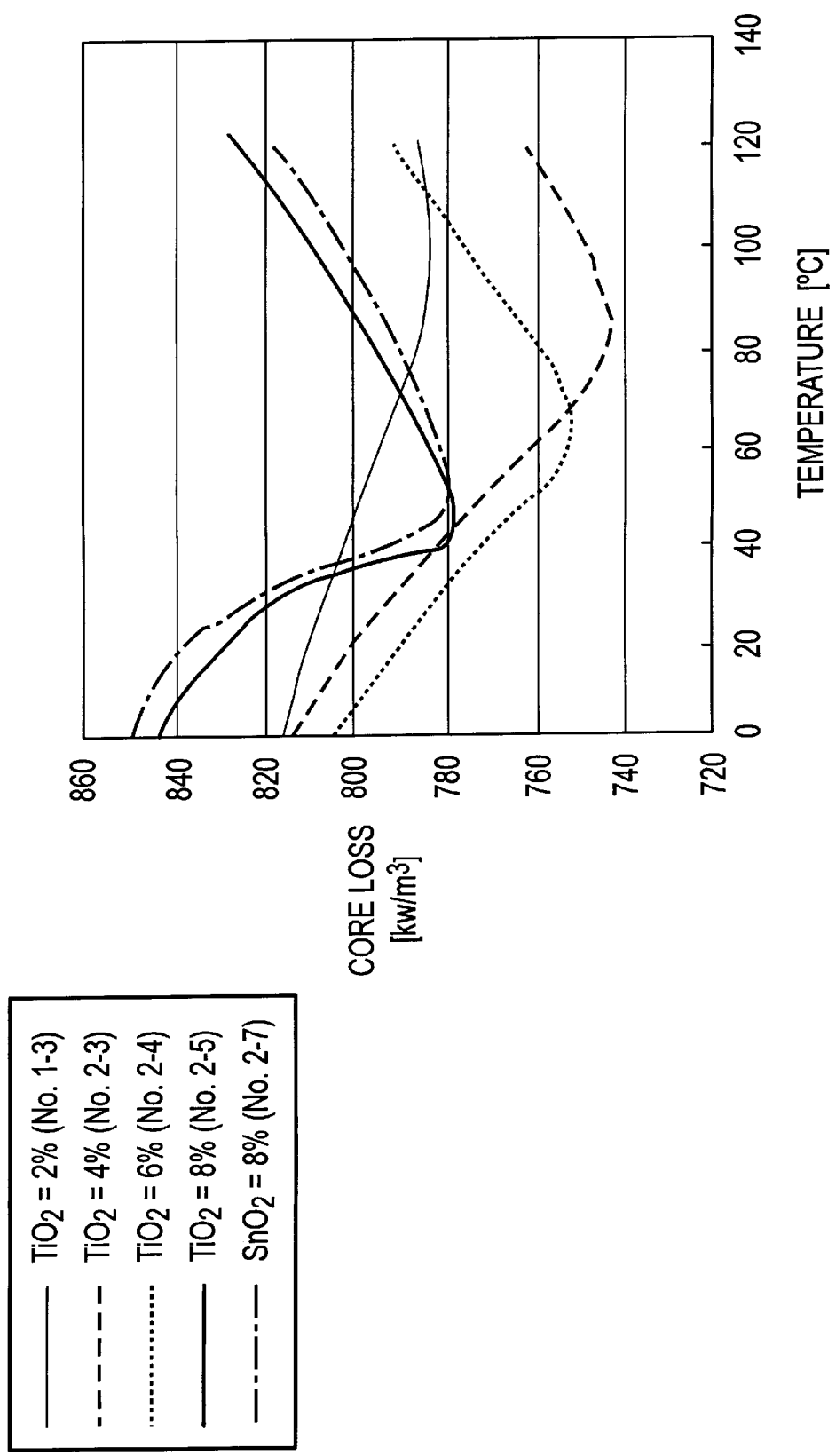
FIG. 1 is a graph showing influence of temperature and containing amount of $TiO_2$ and $SnO_2$ which affects core loss.

The present invention newly contains CuO and at least one member selected from the group consisting of $SnO_2$ and TiO$_2$, in addition to Fe$_2$O$_3$, ZnO and MnO which are basic components of the conventional Mn—Zn ferrite in order to provide a Mn—Zn ferrite which can sufficiently withstand the use in a high frequency region exceeding 1 MHz. The basic components are a composition comprising 44.0 to 50.0 mol % Fe$_2$O$_3$, 4.0 to 26.5 mol % ZnO, 0.1 to 8.0 mol % at least one member selected from the group consisting of SnO$_2$ and TiO$_2$, 0.1 to 16.0 mol % CuO, and the remainder being MnO.

Iron components in the Mn—Zn ferrite are present as Fe$^{3+}$ and Fe$^{2+}$. It is known that Ti and Sn receive electrons from Fe$^{3+}$ to form Fe$^{2+}$. Therefore, by containing those components, Fe$^{2+}$ can be formed even by sintering in air. The present invention makes it possible to obtain an excellent soft magnetism such that the contents of TiO$_2$ and/or SnO$_2$ in the basic component composition are made 0.1 to 8.0 mol %, thereby controlling the amount of Fe$^{2+}$ formed and optimizing the presence ratio of Fe$^{3+}$ and Fe$^{2+}$, so that positive and negative crystal magnetic anisotropies are compensated. Further, according to the present invention, since many Ti$^{4+}$ and Sn$^{4+}$ having the stable number of valency are present, exchange of electrons between Fe$^{3+}$ and Fe$^{2+}$ are substantially inhibited, and as a result, electrical resistance far larger than the conventional one (about 10$^3$ times) can be obtained. However, if the content of TiO$_2$ and/or SnO$_2$ is less than 0.1 mol %, its effect becomes small, and on the other hand, if it exceeds 8.0 mol %, the initial permeability is decreased. Therefore, the content is limited to the above range of 0.1 to 8.0 mol %.

As described above, the present invention can obtain a sufficient soft magnetism even by sintering in air, but in order to further improve the soft magnetism, it is desirable to limit the Fe$_2$O$_3$ content to 50 mol % or less, thereby promoting the densification. However, if Fe$_2$O$_3$ content is too small, it causes decrease in initial permeability. Therefore, Fe$_2$O$_3$ should contain at least 44.0 mol %.

ZnO influences curie temperature and saturation magnetization. If ZnO is too large, the curie temperature is lowered, resulting in a practical problem. On the other hand, if it is too small, saturation magnetization is decreased. Therefore, ZnO is desirable to be in the above-described range of 4.0 to 26.5 mol %.

CuO enables a low temperature sintering. However, if CuO is too small, its effect is small. On the other hand, if it is too large, the initial permeability is decreased. Therefore, CuO is desirable to be in the above-described range of 0.1 to 16.0 mol %.

It is known that CaO and SiO$_2$ make the grain boundary high resistance as described above. It is also known that those have the function to promote sintering of Mn—Zn ferrite. Therefore, adding CaO and SiO$_2$ as additives to the above-described basic component composition is effective in obtaining a highly dense magnetic material. In order to obtain the desired effect, it is necessary to contain CaO and SiO$_2$ in an amount of 0.005 mass % or more. However, if the amount thereof added is too large, abnormal grain growth occurs. Therefore, the upper limit of CaO should be 0.200 mass % and that of SiO$_2$ should be 0.050 mass %.

The Mn—Zn ferrite according to the present invention may contain at least one member selected from the group consisting of V$_2$O$_5$, Bi$_2$O$_3$, In$_2$O$_3$, PbO, MoO$_3$ and WO$_3$ as additives. These additives each is an oxide having a low melting point and has a function to promote sintering. However, if the content of these components is small, its effect is small, and on the other hand, if it is too large, the abnormal grain growth occurs. Therefore, the content of V$_2$O$_5$ is desirable to be 0.010–0.200 mass %; Bi$_2$O$_3$, In$_2$O$_3$, PbO 0.005–0.100 mass %; and WO$_3$ 0.001–0.050 mass %.

The Mn—Zn ferrite according to the present invention may contain at least one member selected from the group consisting of ZrO$_2$, Ta$_2$O$_5$, HfO$_2$, Nb$_2$O$_5$ and Y$_2$O$_3$ as additives. These additives each is an oxide having high melting point and has a function to suppress grain growth. If crystal grains become small, electrical resistance is increased. Therefore, the initial permeability in high frequency region can be improved by containing those additives in appropriate amount. However, if the content of those components is small, its effect is small, and on the other hand, if it is too large, the initial permeability is decreased. Therefore, the content of each of those components is desirable to be 0.010 to 0.200 mass %.

The Mn—Zn ferrite according to the present invention may contain at least one of Cr$_2$O$_3$ and Al$_2$O$_3$ as additives. Those additives have the function to improve temperature characteristic of initial permeability. However, if the content thereof is too small, its effect is small, and on the other hand, if it is too large, the permeability is decreased. Therefore, the content of each of those components is desirable to be 0.020 to 0.300 mass %.

In producing Mn—Zn ferrite, each raw material powder of Fe$_2$O$_3$, ZnO, TiO$_2$ and/or SnO$_2$, CuO and MnO as the main components are previously weighed in the predetermined proportions, and those are mixed to obtain a mixed powder. This powder is calcined and finely milled. The calcination temperature described above can select an appropriate temperature within the range of 850 to 950° C., although varying depending on the objective composition. Further, the fine milling of the mixed powder can be conducted with widely used ball mills. If desired and necessary, the powder of the above-described various additives are added in predetermined amount to the mixed fine powder and mixed to obtain a mixed powder having the objective composition. Granulation and pressing are conducted according to the conventional ferrite production process, and sintering is then conducted to obtain a sintered product. The above-described granulation is conducted by adding binders such as polyvinyl alcohols, polyacryl amides, methyl cellulose, polyethylene oxides or glycerin, and the like. Further, the pressing is conducted by applying a pressure of, for example, 80 MPa or more. Further, sintering is conducted by, for example, a method of maintaining at a temperature of, for example, 1,000 to 1,300° C. for an appropriate temperature in air.

The Mn—Zn ferrite thus obtained contains SnO$_2$ and/or TiO$_2$ as the main components. Therefore, the electrical resistance is markedly increased as compared with the conventional Mn—Zn ferrite (approx. 10$^3$ times).

In general, the limit of the initial permeability $\mu$ in a soft magnetic ferrite is inversely proportional to a frequency f (MHz) at which the ferrite is used, and is estimated by the value given by the equation of $$\mu = K/f \ (K=1{,}500-2{,}000).$$

According to the Mn—Zn ferrite of the present invention, the initial permeability of 300–400 as estimated in the frequency of 5 MHz can be obtained, and the ferrite is suitable as magnetic core materials and electromagnetic wave absorbers for high frequency exceeding 1 MHz.

The present invention is described in more detail by reference to the following Examples, but the invention should not be limited thereto.

On each of Samples 1-1 to 1-8 obtained above, final component composition was confirmed by fluorescent X ray analysis, and also sintered density, initial permeability at 500 kHz and 5 MHz, and electrical resistance and magnetic core loss at 1 MHz and 50 mT were measured.

The results obtained are shown in Table 1 below.

TABLE 1

| SAMPLE NO. | SAMPLE | BASIC COMPONENT COMPOSITION (mol %) | | | | | SINTERED DENSITY $\times 10^3$ (kg/m$^3$) | ELECTRICAL RESISTANCE ($\Omega$m) | INITIAL PERMEABILITY | | CORE LOSS (kW/m$^3$) |
|---|---|---|---|---|---|---|---|---|---|---|---|
| | | $Fe_2O_3$ | MnO | ZnO | CuO | $TiO_2$ | | | 500 kHz | 5 MHz | (1 MHz, 50 mT) |
| 1-1 | COMPARATIVE | 52.0 | 17.4 | 16.6 | 12.0 | 2.0 | 4.48 | 1.4 | 250 | 1 | 3000 |
| 1-2 | INVENTION | 50.0 | 18.4 | 17.6 | 12.0 | 2.0 | 4.82 | $1.9 \times 10^3$ | 1140 | 300 | 980 |
| 1-3 | INVENTION | 48.0 | 19.4 | 18.6 | 12.0 | 2.0 | 4.88 | $2.3 \times 10^3$ | 1580 | 390 | 810 |
| 1-4 | INVENTION | 46.0 | 20.4 | 19.6 | 12.0 | 2.0 | 4.92 | $2.4 \times 10^3$ | 1370 | 370 | 850 |
| 1-5 | INVENTION | 44.0 | 21.5 | 20.5 | 12.0 | 2.0 | 4.93 | $2.6 \times 10^3$ | 1010 | 310 | 960 |
| 1-6 | COMPARATIVE | 42.0 | 22.5 | 21.5 | 12.0 | 2.0 | 4.95 | $2.9 \times 10^3$ | 520 | 170 | 2160 |
| 1-7 | INVENTION | 48.0 | 19.4 | 18.6 | 12.0 | $SnO_2$ 2.0 | 4.91 | $2.2 \times 10^3$ | 1580 | 400 | 860 |
| 1-8 | COMPARATIVE | 52.5 | 22.2 | 21.3 | 0 | 0 | 4.88 | $1.5 \times 10^{-1}$ | 1580 | 1 | 1390 |

EXAMPLE 1

Each raw material powder was mixed with ball mill such that $Fe_2O_3$ was 42.0–52.0 mol %, $TiO_2$ or $SnO_2$ was 2.0 mol %, CuO was 12.0 mol % and the remainder was MnO and ZnO in a molar ratio of 26:25. The resulting mixture was calcined at 900° C. for 2 hours in air, and then milled with ball mill for 20 hours to obtain a mixed powder. This mixed powder was adjusted to the components so as to have the above-described composition, and further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,000° C. for 3 hours in air to obtain Samples 1–1 to 1–7 as shown in Table 1.

For the sake of comparison, each raw material powder was mixed with ball mill such that $Fe_2O_3$ was 52.5 mol %, MnO was 24. 2 mol %, and ZnO was 23.3 mol %. The resulting mixture was calcined at 900° C. for 2 hours in air, and then milled with ball mill for 20 hours to obtain a mixed powder. This mixed powder was adjusted in the components so as to have the above-described composition, and 0.050 mass % of CaO and 0.010 mass % of $SiO_2$ were added thereto as additives. The resulting mixture was further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,200° C. for 3 hours in nitrogen atmosphere to obtain Sample 1-8 having the $Fe_2O_3$ content of more than 50 mol % as is same as the conventional one.

From the results shown in Table 1, Samples 1-2 to 1-5 and 1-7 (samples of the present invention) having the $Fe_2O_3$ content of 50.0 mol % or less each have sufficiently high sintered density, and also marked high electrical resistance and initial permeability at 500 kHz and 5 MHz, and decreased core loss as compared with Sample 1 (comparative sample) having the $Fe_2O_3$ content of more than 50.0 mol %. Of the samples of the present invention, Sample 1-3 has the highest initial permeability. This is due to increase in electrical resistance. Further, Sample 1-6 as the comparative sample has the $Fe_2O_3$ content as small as 44.0 mol % or less, so that the initial permeability thereof at 500 kHz and 5 MHz is far lower as compared with that of the samples of the present invention. Further, Sample 1-8 having the $Fe_2O_3$ content of larger than 50 mol % as the same as in the conventional one is that the initial permeability at 5 MHz is decreased to the level 1 of the permeability of vacuum magnetic constant, and thus completely loses the characteristics as a soft magnetic material.

EXAMPLE 2

Each raw material powder was mixed with ball mill such that $Fe_2O_3$ was 48.0 mol %, $TiO_2$ or $SnO_2$ was 0–10.0 mol %, CuO was 12.0 mol %, and the remainder was MnO and ZnO in a molar ratio of 26:25. The resulting mixture was calcined at 900° C. for 2 hours in air, and then milled with ball mill for 20 hours to obtain a mixed powder. This powder was adjusted to the components so as to have the above-described composition, and further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,000° C. for 3 hours in air to obtain Samples 2-1 to 2-7 as shown in Table 2.

On each of Samples 2-1 to 2-7 obtained above, final component composition was confirmed by fluorescent X ray analysis, and initial permeability at 5 MHz and core loss at 1 MHz and 50 mT were measured. Further, as to Samples 1-3, 2-3, 2-4, 2-5 and 2-7 of the present invention, temperature properties of core loss at 1 MHz and 50 mT were measured. The results obtained are shown in Table 2 and FIG. 1.

tures in accordance with the temperature to be used in particular as ferrite having low loss it can be effectively used.

EXAMPLE 3

Each raw material powder was mixed with ball mill such that $Fe_2O_3$ was 48.0 mol %, $TiO_2$ was 2.0 mol %, CuO was 0–20 mol %, and the remainder was MnO and ZnO in a

TABLE 2

| SAMPLE NO. | SAMPLE | BASIC COMPONENT COMPOSITION (mol %) | | | | | INITIAL PERMEABILITY 5 MHz | CORE LOSS ($kW/m^3$) (1 MHz, 50 mT) |
|---|---|---|---|---|---|---|---|---|
| | | $Fe_2O_3$ | MnO | ZnO | CuO | $TiO_2$ | | |
| 2-1 | COMPARATIVE | 48.0 | 20.4 | 19.6 | 12.0 | 0 | 40 | 3000 |
| 2-2 | INVENTION | 48.0 | 20.4 | 19.5 | 12.0 | 0.1 | 300 | 910 |
| 1-3 | INVENTION | 48.0 | 19.4 | 18.6 | 1Z.0 | 2.0 | 390 | 810 |
| 2-3 | INVENTION | 48.0 | 18.4 | 17.6 | 12.0 | 4.0 | 370 | 800 |
| 2-4 | INVEVTION | 48.0 | 17.4 | 16.6 | 12.0 | 6.0 | 350 | 790 |
| 2-5 | INVENTION | 48.0 | 16.3 | 15.7 | 12.0 | 8.0 | 310 | 830 |
| 2-6 | COMPARATIVE | 48.0 | 15.3 | 14.7 | 12.0 | 10.0 | 210 | 1150 |
| 2-7 | INVENTION | 48.0 | 16.3 | 15.7 | 12.0 | $SnO^2$ 8.0 | 320 | 840 |

From the results shown in Table 2, Samples 1-3, 2-2 to 2-5 which contain $TiO_2$ in an appropriate amount and Sample 2-7 which contains $SnO_2$ in an appropriate amount each have markedly high initial permeability and remarkably low core loss as compared with Sample 2-1 (comparative sample) which does not contain $TiO_2$ at all. Further, the initial permeability of Sample 2-6 (comparative sample) containing relatively large amount (10.0 mol %) of $TiO_2$ is high as compared with Sample 2-1 (comparative sample) which does not contain $TiO_2$ at all and low in core loss, but the initial permeability becomes low and core loss becomes high as compared with Samples 2-1 to 2-5 and 2-7 of the present invention.

Further, from the results indicated in FIG. 1, for example, Sample 1-3 of $TiO_2$=2.0 mol % is small in temperature change and can be effectively used as ferrite for inductance elements and for impedance elements. Further, in Samples 2-3~2-5 and 2-7 which contain $TiO_2$=4.0~8.0 mol % the temperature which shows the minimum value of core loss scatters within 50~90° C., by making use of such temperamolar ratio of 26:25. The resulting mixture was calcined at 900° C. for 2 hours in air, and then milled with ball mill for 20 hours to obtain a mixed powder. This mixed powder was adjusted to the components so as to have the above-described composition, and further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 900° C., 1,000° C., 1,100° C., 1,200° C., and 1,300° C. for 3 hours in air to obtain Samples 3-1 to 3-7 as shown in Table 3. Sample 3-5 had the same component composition as in the sample 1-3 in Example 1. On each of sample 3-1 to 3-7 obtained above, final component composition was confirmed by fluorescent X ray analysis, and initial permeability at 5 MHz was measured. The results obtained are shown in Table 3 appeared below and FIG. 2.

TABLE 3

| SAMPLE NO. | SAMPLE | BASIC COMPONENT COMPOSITION (mol %) | | | | | INITIAL PERMEABILITY AT EACH SINTERING TEMPERATURE 5 MHZ | | | | |
|---|---|---|---|---|---|---|---|---|---|---|---|
| | | $Fe_2O_3$ | MnO | ZnO | CuO | $TiO_2$ | 1300° C. | 1200° C. | 1100° C. | 1000° C. | 900° C. |
| 3-1 | COMPARATIVE | 48.0 | 25.5 | 24.5 | 0 | 2.0 | 390 | 350 | 270 | 160 | 30 |
| 3-2 | INVENTION | 48.0 | 25.4 | 24.5 | 0.1 | 2.0 | 380 | 360 | 280 | 200 | 60 |
| 3-3 | INVENTION | 48.0 | 23.5 | 22.5 | 4.0 | 2.0 | 360 | 400 | 360 | 290 | 190 |
| 3-4 | INVENTION | 48.0 | 21.4 | 20.6 | 8.0 | 2.0 | 320 | 370 | 390 | 360 | 290 |
| 3-5 | INVENTION | 48.0 | 19.4 | 18.6 | 12.0 | 2.0 | 270 | 330 | 370 | 390 | 360 |
| 3-6 | INVENTION | 48.0 | 17.3 | 16.7 | 16.0 | 2.0 | 200 | 270 | 320 | 350 | 380 |
| 3-7 | COMPARATIVE | 48.0 | 15.2 | 14.8 | 20.0 | 2.0 | 112 | 170 | 220 | 260 | 290 |

Figure 2:
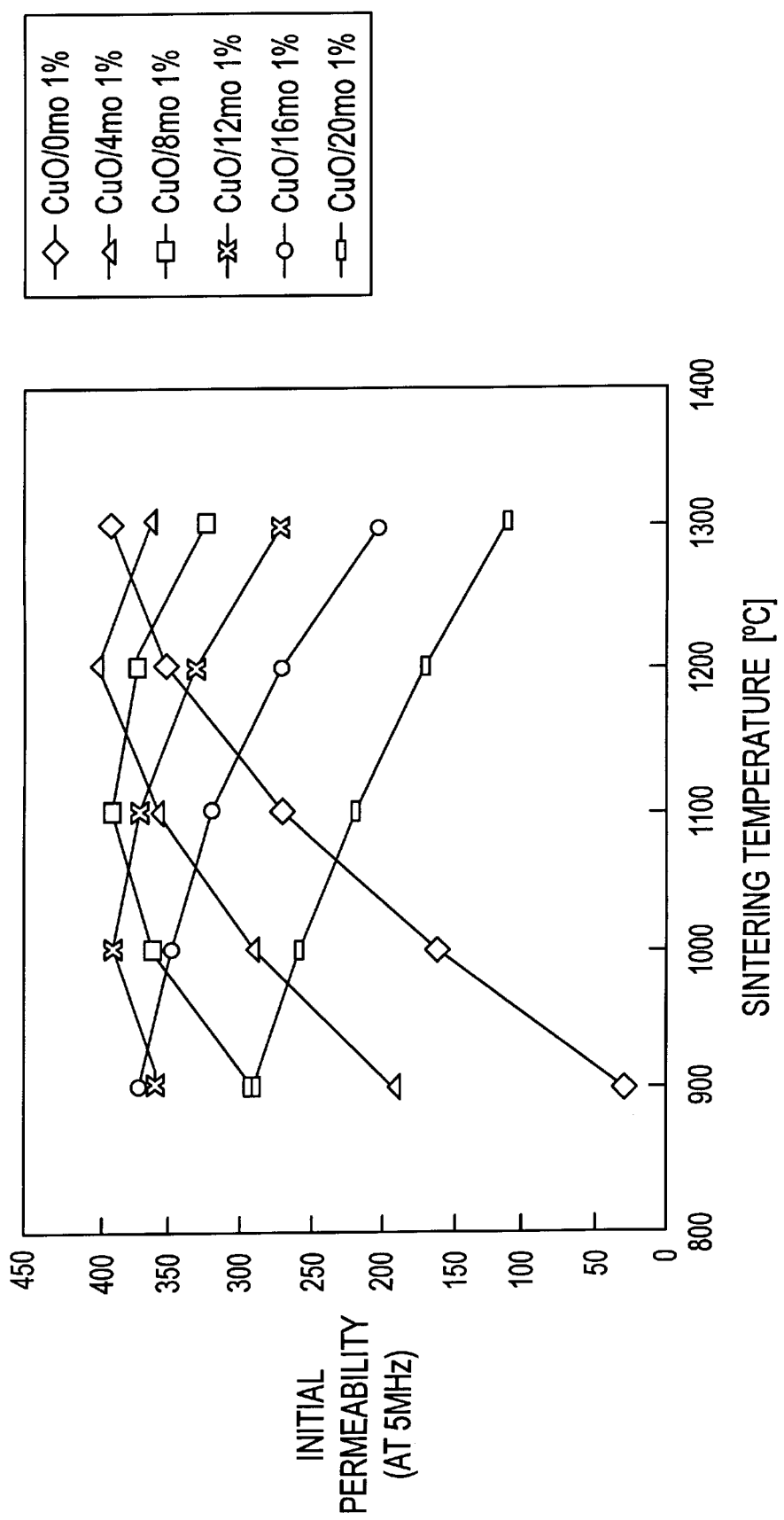
FIG. 2 is a graph showing influence of sintering temperature and containing amount of CuO which affects initial permeability.

From the results shown in Table 3 and FIG. 2, in Sample 3-1 (comparative sample) which does not contain CuO at all, the sintering temperature must be set to a high temperature of 1,100° C. or more in order to obtain high initial permeability of 200 or more. On the other hand, Samples 3-2 to 3-6

(the samples of the present invention) containing CuO in an appropriate amount obtain high initial permeability of 200 or more even by setting the sintering temperature to low temperature of about 1,000° C. However, in Sample 3-7 (comparative sample) containing CuO in relatively large amount (20.0 mol %), the initial permeability is greatly decreased when sintering is conducted at high temperature of 1,200° C. or more, and when compared at the same temperature of 1,100° C., the initial permeability is decreased as compared with Samples 3-2 to 3-6 of the present invention.

EXAMPLE 4

Each raw material powder was mixed with ball mill such that $Fe_2O_3$ was 48.0 mol %, MnO was 19.4 mol %, ZnO was 18.6 mol %, $TiO_2$ was 2.0 mol % and CuO was 12.0 mol % (the same as in the Sample 1-3 in Example 1). The resulting mixture was calcined at 900° C. for 2 hours in air, and then milled with ball mill for 20 hours to obtain a mixed powder. This mixed powder was adjusted to the components so as to have the above-described composition, and CaO or $SiO_2$ were added thereto as additives in various amounts as shown in Table 4. The resulting mixture was further mixed with ball mill for 1 hour. Polyvinyl alcohol was added to this mixed powder, and granulated. The resulting granulates were pressed into toroidal cores each having an outer diameter of 18 mm, an inner diameter of 10 mm and a height of 4 mm under a pressure of 80 MPa. Each green compact was placed in a sintering furnace, and sintered at 1,300° C. for 3 hours in air to obtain Samples 4-1 to 4-6 as shown in Table 4.

On each of Samples 4-1 to 4-6 obtained above, final component composition was confirmed by fluorescent X ray analysis, and also sintered density and initial permeability at 5 MHz were measured.

The results obtained are shown in Table 4 below.

From the results shown in Table 4, in Samples 4-1, 4-2, 4-4 and 4-5 (the samples of the present invention) containing CaO or $SiO_2$ in an appropriate amount, sintered density and initial permeability each is improved as compared with Sample 1-3 which does not contain those components at all (the sample of the present invention in Example 1). However, in Samples 4-3 and 4-6 (comparative sample) containing CaO or $SiO_2$ in a slightly large amount, the sintered density is improved, but the initial permeability is decreased, as compared with the above-described samples of the present invention.

EXAMPLE 5

The predetermined amounts of $V_2O_5$, $Bi_2O_3$, $In_2O_3$, PbO, $MoO_3$ and $WO_3$ as additives were added to the mixed powder having the same component composition as in Example 4. The resulting mixed powder was mixed, granulated, pressed and sintered under the same conditions as in Example 4 to obtain Samples 5-1 to 5-14 as shown in Table 5.

On each of Samples 5-1 to 5-14 obtained above, final component composition was confirmed by fluorescent X ray analysis, and also sintered density and initial permeability at 5 MHz were measured.

The results obtained are shown in Table 5 below.

TABLE 4

| SAMPLE | | BASIC COMPONENT COMPOSITION (mol %) | | | | | ADDITIVE (mass %) | | SINTERED DENSITY | INITIAL PERMEABILITY |
|---|---|---|---|---|---|---|---|---|---|---|
| No. | SAMPLE | $Fe_2O_3$ | MnO | ZnO | CuO | $TiO_2$ | CaO | $SiO_2$ | $\times 10^3$ (kg/m$^3$) | 5 MHz |
| 1-3 | INVENTION | 48.0 | 19.4 | 18.6 | 12.0 | 2.0 | 0 | 0 | 4.88 | 390 |
| 4-1 | INVENTION | 48.0 | 19.4 | 18.6 | 12.0 | 2.0 | 0.005 | 0 | 4.90 | 400 |
| 4-2 | INVENTION | 48.0 | 19.4 | 18.6 | 12.0 | 2.0 | 0.200 | 0 | 4.92 | 410 |
| 4-3 | COMPARATIVE | 48.0 | 19.4 | 18.6 | 12.0 | 2.0 | 0.300 | 0 | 4.95 | 270 |
| 4-4 | INVENTION | 48.0 | 19.4 | 18.6 | 12.0 | 2.0 | 0 | 0.005 | 4.91 | 400 |
| 4-5 | INVENTION | 48.0 | 19.4 | 18.6 | 12.0 | 2.0 | 0 | 0.050 | 4.93 | 410 |
| 4-6 | COMPARATIVE | 48.0 | 19.4 | 18.6 | 12.0 | 2.0 | 0 | 0.100 | 4.94 | 260 |

TABLE 5

| SAMPLE | | BASIC COMPONENT COMPOSITION (mol %) | | | | | ADDITIVE (mass %) | | SINTERED DENSITY | INITIAL |
|---|---|---|---|---|---|---|---|---|---|---|
| NO. | SAMPLE | $Fe_2O_3$ | MnO | ZnO | CuO | $TiO_2$ | KIND | CONTENT | $10^3$ (kg/m$^3$) | PERMEABILITY 5 MHz |
| 1-3 | INVENTION | 48.0 | 19.4 | 18.6 | 12.0 | 2.0 | NONE | | 4.88 | 390 |
| 5-1 | INVENTION | 48.0 | 19.4 | 18.6 | 12.0 | 2.0 | $V_2O_5$ | 0.010 | 4.90 | 400 |

TABLE 5-continued

| SAMPLE | | BASIC COMPONENT COMPOSITION (mol %) | | | | | ADDITIVE (mass %) | | SINTERED DENSITY | INITIAL |
|---|---|---|---|---|---|---|---|---|---|---|
| NO. | SAMPLE | $Fe_2O_3$ | MnO | ZnO | CuO | $TiO_2$ | KIND | CONTENT | $10^3$ (kg/m$^3$) | PERMEABILITY 5 MHz |
| 5-2 | INVENTION | 48.0 | 19.4 | 18.6 | 12.0 | 2.0 | $V_2O_5$ | 0.200 | 4.91 | 410 |
| 5-3 | COMPARATIVE | 48.0 | 19.4 | 18.6 | 12.0 | 2.0 | $V_2O_5$ | 0.300 | 4.94 | 270 |
| 5-4 | INVENTION | 48.0 | 19.4 | 18.6 | 12.0 | 2.0 | $Bi_2O_3$ | 0.005 | 4.91 | 400 |
| 5-5 | INVENTION | 48.0 | 19.4 | 18.6 | 12.0 | 2.0 | $Bi_2O_3$ | 0.100 | 4.94 | 420 |
| 5-6 | COMPARATIVE | 48.0 | 19.4 | 18.6 | 12.0 | 2.0 | $Bi_2O_3$ | 0.200 | 4.97 | 250 |
| 5-7 | INVENTION | 48.0 | 19.4 | 18.6 | 12.0 | 2.0 | $In_2O_3$ | 0.100 | 4.94 | 410 |
| 5-8 | INVENTION | 48.0 | 19.4 | 18.6 | 12.0 | 2.0 | PbO | 0.100 | 4.93 | 410 |
| 5-9 | INVENTION | 48.0 | 19.4 | 18.6 | 12.0 | 2.0 | $MoO_3$ | 0.001 | 4.90 | 4D0 |
| 5-10 | INVENTION | 48.0 | 19.4 | 18.6 | 12.0 | 2.0 | $MoO_3$ | 0.050 | 4.93 | 400 |
| 5-11 | COMPARATIVE | 48.0 | 19.4 | 18.6 | 12.0 | 2.0 | $MoO_3$ | 0.100 | 4.96 | 250 |
| 5-12 | INVENTION | 48.0 | 19.4 | 18.6 | 12.0 | 2.0 | $WO_3$ | 0.050 | 4.92 | 400 |
| 5-13 | INVENTION | 48.0 | 19.4 | 18.6 | 12.0 | 2.0 | $V_2O_5$ CaO | 0.200 0.200 | 4.92 | 410 |
| 5-14 | INVENTION | 48.0 | 19.4 | 18.6 | 12.0 | 2.0 | $V_2O_5$ $SiO_2$ | 0.200 0.050 | 4.93 | 410 |

From the results shown in Table 5, in Samples 5-1, 5-2, 5-4, 5-5, 5-7 to 5-10, and 5-12 to 5-14 (the samples of the present invention) containing $V_2O_5$, $Bi_2O_3$, $In_2O_3$, PbO, $MoO_3$ and $WO_3$ in an appropriate amount, sintered density and initial permeability are improved as compared with Sample 1-3 (the sample of the present invention in Example 1) which does not contain those components at all. However, in Samples 5-3, 5-6 and 5-11 (comparative samples) containing those additives in relatively large amount, the sintered density is improved, but the initial permeability is decreased, as compared with the above-described samples of the present invention.

TABLE 6

| SAMPLE | | BASIC COMPONENT COMPOSITION (mol %) | | | | | ADDITIVE (mass %) | | GRAIN SIZE | INITIAL | ELECTRICAL RESISTANCE |
|---|---|---|---|---|---|---|---|---|---|---|---|
| NO. | SAMPLE | $Fe_2O_3$ | MnO | ZnO | CuO | $TiO_2$ | KIND | CONTENT | (μm) | PERMEABILITY 5 MHz | (Ωm) |
| 1-3 | INVENTION | 48.0 | 19.4 | 18.6 | 12.0 | 2.0 | NONE | | 13 | 390 | $2.3 \times 10^3$ |
| 6-1 | INVENTION | 48.0 | 19.4 | 18.6 | 12.0 | 2.0 | $ZrO_2$ | 0.010 | 8 | 400 | $2.6 \times 10^3$ |
| 6-2 | INVENTION | 48.0 | 19.4 | 18.6 | 12.0 | 2.0 | $ZrO_2$ | 0.200 | 5 | 410 | $2.8 \times 10^3$ |
| 6-3 | COMPARATIVE | 48.0 | 19.4 | 18.6 | 12.0 | 2.0 | $ZrO_2$ | 0.300 | 4 | 260 | $3.3 \times 10^3$ |
| 6-4 | INVENTION | 48.0 | 19.4 | 18.6 | 12.0 | 2.0 | $HfO_2$ | 0.200 | 6 | 400 | $2.7 \times 10^3$ |
| 6-5 | INVENTION | 48.0 | 19.4 | 18.6 | 12.0 | 2.0 | $Ta_2O_3$ | 0.200 | 6 | 410 | $2.8 \times 10^3$ |
| 6-6 | INVENTION | 48.0 | 19.4 | 18.6 | 12.0 | 2.0 | $Nb_3O_5$ | 0.200 | 6 | 400 | $2.7 \times 10^3$ |
| 6-7 | INVENTION | 48.0 | 19.4 | 18.6 | 12.0 | 2.0 | $V_2O_3$ | 0.200 | 5 | 420 | $3.1 \times 10^3$ |
| 6-8 | INVENTION | 48.9 | 19.4 | 18.6 | 12.0 | 2.0 | $ZrO_3$ CaO | 0.200 0.200 | 5 | 420 | $2.7 \times 10^3$ |
| 6-9 | INVENTION | 48.0 | 19.4 | 18.6 | 12.0 | 2.0 | $ZrO_2$ $SiO_2$ | 0.200 0.050 | 5 | 420 | $2.9 \times 10^3$ |

EXAMPLE 6

The predetermined amounts of $ZrO_2$, $Ta_2O_5$, $HfO_2$, $Nb_2O_5$ and $Y_2O_3$ as additives were added to the mixed powder having the same component composition as in Example 4. The resulting mixed powder was mixed, granulated, pressed and sintered under the same conditions as in Example 4 to obtain Samples 6-1 to 6-9 as shown in Table 6. On each of Samples 6-1 to 6-9 obtained above, final component composition was confirmed by fluorescent X ray analysis, and also grain size, initial permeability at 5 MHz and electrical resistance were measured.

The results obtained are shown in Table 6 below.

From the results shown in Table 6, in Samples 6-1, 6-2 and 6-4 to 6-9 (the samples of the present invention) containing $ZrO_2$, $Ta_2O_5$, $HfO_2$, $Nb_2O_5$ and $Y_2O_3$ in an appropriate amount, its grain size becomes small to the extent of 5 to 8 μm as compared with the grain size of 13 μm of Sample 1-3 (the sample of the present invention of Example 1) which does not contain those components at all, and for this reason, the initial permeability is also improved. However, in the sample containing additives in a relatively large amount as in Sample 6-3 (comparative sample), the grain size is decreased, but improvement effect of the initial permeability is not recognized.

EXAMPLE 7

The predetermined amounts of $Cr_2O_3$ and $Al_2O_3$ as additives were added to the mixed powder having the same component composition as in Example 4. The resulting mixed powder was mixed, granulated, pressed and sintered under the same conditions as in Example 4 to obtain Samples 7-1 to 7-6 as shown in Table 7. On each of Samples 7-1 to 7-6 obtained above, final component composition was confirmed by fluorescent X ray analysis, and also grain size, initial permeability at 5 MHz and temperature factor of initial permeability were measured. The temperature factor of initial permeability is an index showing temperature characteristic of the initial permeability, and is given by the following equation.

Temperature factor of initial permeability=$(\mu_2-\mu_1)/\mu_1^2/(T_2-T_1)$ wherein $\mu_1$: Initial permeability at temperature $T_1$
$\mu_2$: Initial permeability at temperature $T_2$
The results obtained are shown in Table 7.

TABLE 7

| SAMPLE | | BASIC COMPONENT COMPOSITION (mol %) | | | | | ADDITIVE (mass %) | | INITIAL PERMEABILITY | TEMPERATURE FACTOR OF INITIAL PERMEABILITY/° C. | |
|---|---|---|---|---|---|---|---|---|---|---|---|
| NO. | SAMPLE | $Fe_2O_3$ | MnO | ZnO | CuO | $TiO_2$ | KIND | CONTENT | 5 MHz | −20 to 20° C. | 20 to 60° C. |
| 1-3 | INVENTION | 48.0 | 19.4 | 18.6 | 12.0 | 2.0 | NONE | | 390 | $14 \times 10^{-6}$ | $12 \times 10^{-6}$ |
| 7-1 | INVENTION | 48.0 | 19.4 | 18.6 | 12.0 | 2.0 | $Cr_2O_3$ | 0.020 | 390 | $9 \times 10^{-6}$ | $7 \times 10^{-6}$ |
| 7-2 | INVEINTION | 48.0 | 19.4 | 18.6 | 12.0 | 2.0 | $Cr_2O_3$ | 0.300 | 380 | $7 \times 10^{-6}$ | $6 \times 10^{-6}$ |
| 7-3 | COMPARATIVE | 48.0 | 19.4 | 18.6 | 12.0 | 2.0 | $Cr_2O_3$ | 0.600 | 240 | $7 \times 10^{-6}$ | $5 \times 10^{-6}$ |
| 7-4 | INVENTION | 48.0 | 19.4 | 18.6 | 12.0 | 2.0 | $Al_2O_3$ | 0.300 | 380 | $8 \times 10^{-6}$ | $8 \times 10^{-6}$ |
| 7-5 | INVENTION | 48.0 | 19.4 | 18.6 | 12.0 | 2.0 | $Cr_2O_3$ CaO | 0.300 0.200 | 390 | $7 \times 10^{-6}$ | $7 \times 10^{-6}$ |
| 7-6 | INVENTION | 48.0 | 19.4 | 18.6 | 12.0 | 2.0 | $Cr_2O_3$ $SiO_2$ | 0.300 0.050 | 390 | $7 \times 10^{-6}$ | $8 \times 10^{-6}$ |

From the results shown in Table 7, in Samples 7-1, 7-2 and 7-4 to 7-6 (the samples of the present invention) containing $Cr_2O_3$ and $Al_2O_3$ in an appropriate amount, the temperature factor of initial permeability becomes small to the grain size of Sample 1-3 which does not contain those components at all (the sample of the present invention in Example 1), and temperature characteristic is improved. However, in the sample containing additives in relatively large amount as in Sample 7-3 (comparative sample), the temperature factor of initial permeability becomes small, but the initial permeability is decreased.

As described above, the Mn—Zn ferrite according to the present invention can obtain markedly large electrical resistance and excellent initial permeability as compared with the conventional Mn—Zn ferrite, and can sufficiently withstand the use in the high frequency region exceeding 1 MHz. Thus, the Mn—Zn ferrite is suitable as magnetic core materials and electromagnetic wave absorbers for high frequency.

Further, the Mn—Zn ferrite according to the present invention enables Mn—Zn ferrite having the $Fe_2O_3$ content of 50 mol % or less to sinter in the air by containing $TiO_2$ and $SnO_2$, and also enables it to sinter at low temperature by containing CuO. As a result, the Mn—Zn ferrite greatly contributes to improvement in productivity, and decrease in production cost.

What is claimed is:

1. A Mn—Zn ferrite comprising the following basic components:
   44.0 to 50.0 mol % $Fe_2O_3$;
   4.0 to 26.5 mol % ZnO;
   0.1 to 8.0 mol % at least one member selected from the group consisting of $TiO_2$ and $SnO_2$;
   0.1 to 16.0 mol % CuO; and
   the remainder being MnO.

2. The Mn—Zn ferrite as claimed in claim 1, which further comprises at least one member selected from the group consisting of 0.005 to 0.200 mass % CaO and 0.005 to 0.050 mass % $SiO_2$ as additives.

3. The Mn—Zn ferrite as claimed in claim 1, which further comprises at least one member selected from the group consisting of
   0.010 to 0.200 mass % $V_2O_5$,
   0.005 to 0.100 mass % $Bi_2O_3$,
   0.005 to 0.100 mass % $In_2O_5$,
   0.005 to 0.100 mass % PbO,
   0.001 to 0.050 mass % $MoO_3$, and
   0.001 to 0.050 mass % $WO_3$ as additives.

4. The Mn—Zn ferrite as claimed in claim 1, which further comprises at least one member selected from the group consisting of
   0.010 to 0.200 mass % $ZrO_2$,
   0.010 to 0.200 mass % $Ta_2O_5$,
   0.010 to 0.200 mass % $HfO_2$,
   0.010 to 0.200 mass % $Nb_2O_5$, and
   0.010 to 0.200 mass % $Y_2O_3$ as additives.

5. The Mn—Zn ferrite as claimed in claim 1, which further comprises at least one member selected from the group consisting of 0.020 to 0.300 mass % $Cr_2O_3$ and 0.020 to 0.300 mass % $Al_2O_3$, as additives.

6. The Mn—Zn ferrite as claimed in claim 2, which further comprises at least one member selected from the group consisting of
   0.010 to 0.200 mass % $V_2O_5$,
   0.005 to 0.100 mass % $Bi_2O_3$,
   0.005 to 0.100 mass % $In_2O_3$,
   0.005 to 0.100 mass % PbO,
   0.001 to 0.050 mass % $MoO_3$, and
   0.001 to 0.050 mass % $WO_3$ as additives.

7. The Mn—Zn ferrite as claimed in claim 2, which further comprises at least one member selected from the group consisting of
   0.010 to 0.200 mass % $ZrO_2$,
   0.010 to 0.200 mass % $Ta_2O_5$,
   0.010 to 0.200 mass % $HfO_2$,
   0.010 to 0.200 mass % $Nb_2O_5$, and
   0.010 to 0.200 mass % $Y_2O_3$ as additives.

8. The Mn—Zn ferrite as claimed in claim 2, which further comprises at least one member selected from the group consisting of 0.020 to 0.300 mass % $Cr_2O_3$ and 0.020 to 0.300 mass % $Al_2O_3$, as additives.

* * * * *